United States Patent
Chae et al.

(10) Patent No.: US 10,626,982 B2
(45) Date of Patent: Apr. 21, 2020

(54) AUTOMOTIVE TRANSMISSION

(71) Applicants: Hyundai Motor Company, Seoul (KR); Kia Motors Corporation, Seoul (KR)

(72) Inventors: Min Ho Chae, Incheon (KR); Yong Uk Shin, Suwon-si (KR); Soon Ki Eo, Ansan-si (KR); Sun Sung Kwon, Anyang-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/169,025

(22) Filed: Oct. 24, 2018

(65) Prior Publication Data
US 2020/0003297 A1 Jan. 2, 2020

(30) Foreign Application Priority Data
Jun. 28, 2018 (KR) .......................... 10-2018-0074722

(51) Int. Cl.
*F16H 59/04* (2006.01)
*F16H 3/46* (2006.01)
*F16H 59/02* (2006.01)

(52) U.S. Cl.
CPC .............. *F16H 59/041* (2013.01); *F16H 3/46* (2013.01); *F16H 2059/0226* (2013.01); *F16H 2200/0021* (2013.01); *F16H 2200/0039* (2013.01); *F16H 2200/2007* (2013.01); *F16H 2200/2033* (2013.01); *F16H 2200/2097* (2013.01)

(58) Field of Classification Search
CPC .. F16H 59/041; F16H 3/46; F16H 2200/2007; F16H 2200/2097; F16H 2200/2033; F16H 2200/0039; F16H 2059/0226; F16H 2200/0021
See application file for complete search history.

(56) References Cited

U.S. PATENT DOCUMENTS

| | | | |
|---|---|---|---|
| 6,213,909 B1 * | 4/2001 | Raghavan | F16H 3/666 475/282 |
| 10,072,734 B2 * | 9/2018 | Slapak | F16H 3/54 |
| 2016/0003351 A1 * | 1/2016 | Park | F16H 3/54 475/153 |
| 2017/0089429 A1 * | 3/2017 | Slapak | F16H 3/54 |
| 2017/0314646 A1 * | 11/2017 | Kulkarni | F16H 3/66 |
| 2018/0056782 A1 * | 3/2018 | Lammers | B60K 17/28 |

FOREIGN PATENT DOCUMENTS

KR 10-2017-0018220 A 2/2017

* cited by examiner

*Primary Examiner* — David J Hlavka
(74) *Attorney, Agent, or Firm* — Morgan, Lewis & Bockius LLP

(57) ABSTRACT

An automotive transmission may include a first planetary gear set having first to third rotation elements, an input shaft engaged with the first rotation element of the first planetary gear set, an output shaft engaged with the second rotation element of the first planetary gear set, and a sleeve section sliding linearly along an axial direction of the first planetary gear set to selectively switch to a first state in which the third rotation element is secured to a transmission housing, a second state in which the third rotation element is engaged with a further rotation element, or a neutral state in which the third rotation element is not secured to or engaged with the transmission housing or the further rotation element.

13 Claims, 9 Drawing Sheets

AUTOMOTIVE TRANSMISSION

CROSS REFERENCE TO RELATED APPLICATION

The present application claims priority to Korean Patent Application No. 10-2018-0074722, filed Jun. 28, 2018, the entire contents of which is incorporated herein for all purposes by this reference.

BACKGROUND OF THE INVENTION

Field of the Invention

The present invention relates to an automotive transmission and, more particularly, to an automotive transmission providing driving force using a motor.

Description of Related Art

Generally, hybrid vehicles or electric vehicles are driven with the power from a motor, and have a simple decelerator or a 2 to 3-speed transmission between the motor and driving wheels to secure the suitable driving force required to a vehicle while reducing the capacity of the motor.

It is preferred that such a transmission has a simple configuration with less transmission loss during traveling of a vehicle, thereby securing high power transmission efficiency.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing an automotive transmission having a simple configuration with less transmission loss during traveling of a vehicle, securing high power transmission efficiency and thus increasing fuel efficiency and the mileage of a vehicle.

In various aspects of the present invention, according to one aspect, various aspects of the present invention are directed to providing an automotive transmission including: a first planetary gear set having first to third rotation elements; an input shaft engaged with the first rotation element of the first planetary gear set; an output shaft engaged with the second rotation element of the first planetary gear set; and a sleeve section sliding linearly along an axial direction of the first planetary gear set to selectively switch to a first state in which the third rotation element is secured to a transmission housing, a second state in which the third rotation element is engaged with a further rotation element, or a neutral state in which the third rotation element is not secured to or engaged with the transmission housing or the further rotation element.

A brake device may be provided between the transmission housing and the sleeve section to restrict rotation of the sleeve section with friction force.

The sleeve section may be operated to switch sequentially between the first state, the neutral state, and the second state during the linear sliding thereof.

The sleeve section may be operated to switch sequentially between the first state, the neutral state, the second state, and an third state during the linear sliding thereof, wherein the brake device is engaged with the sleeve section only in the first state, the neutral state, and the second state, and is disengaged from the sleeve section in the third state.

The first rotation element may be a sun gear, the second rotation element may be a first planet carrier, and the third rotation element may be a first ring gear.

In the second state of the sleeve section, the first planet carrier may be engaged with the first ring gear.

The sleeve section may be respectively provided, on internal and external circumferential surfaces, with internal and external splines to be engaged with both the transmission housing and the first planet carrier, and both the brake device and the first ring gear.

A second planetary gear set may be additionally engaged with the second rotation element of the first planetary gear set to decelerate the speed of driving power.

According to an exemplary embodiment of the present invention, the automotive transmission has a simple configuration with less transmission loss during traveling of a vehicle, securing high power transmission efficiency and thus increasing fuel efficiency and the mileage of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
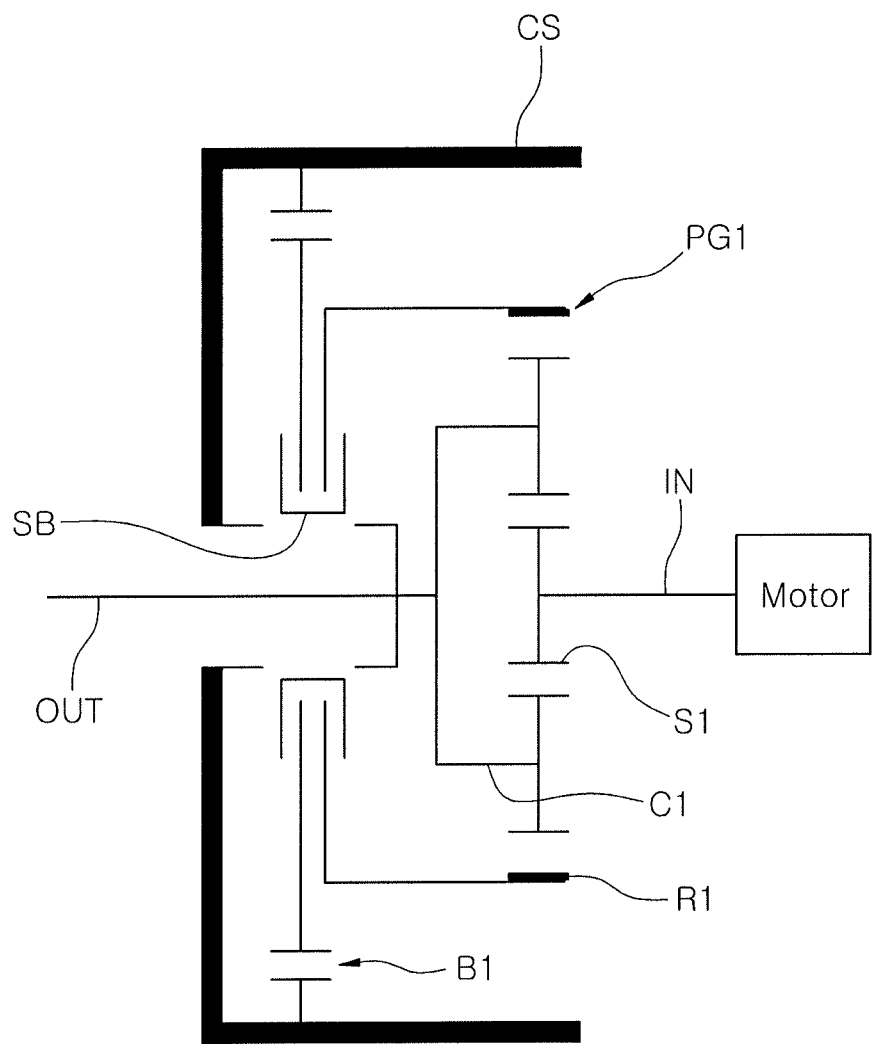
FIG. 1 is a schematic view illustrating the configuration of an automotive transmission according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

Figure 2:
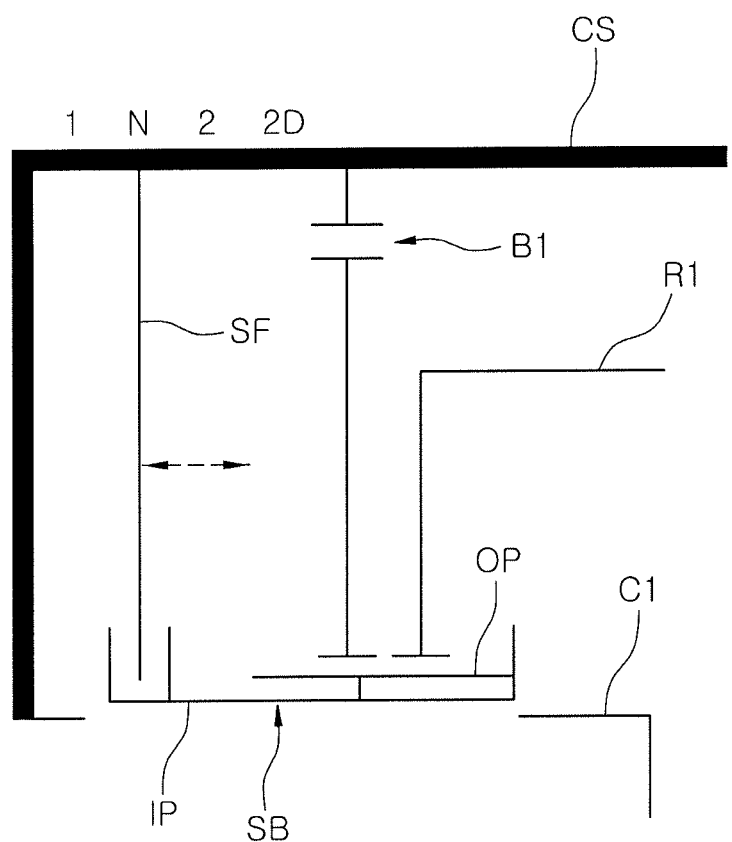
FIG. 2 is a schematic view illustrating a sleeve section of the transmission shown in FIG. 1 in a neutral state.
Figure 3:
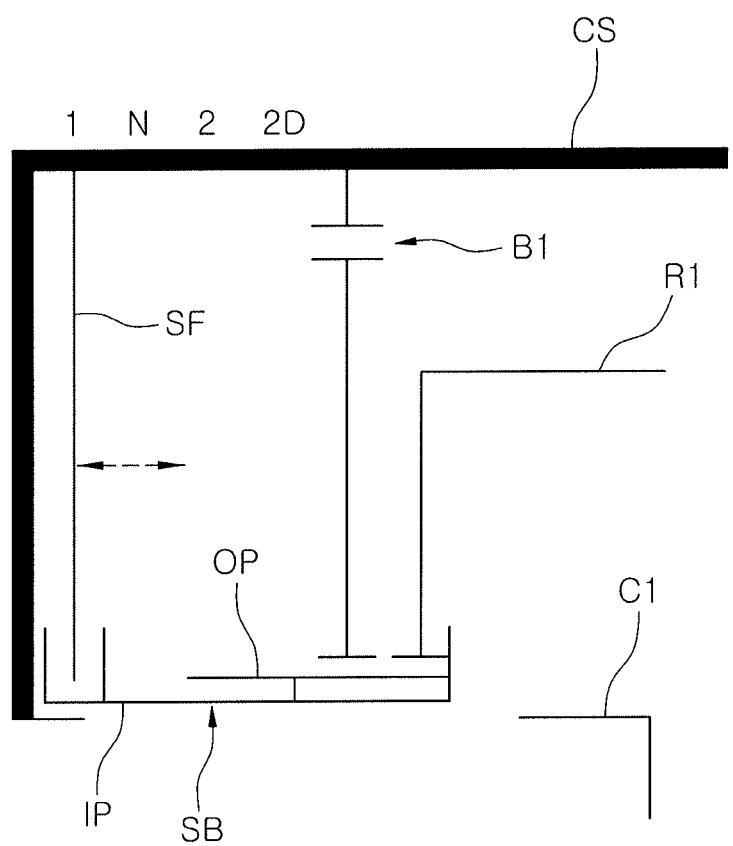
FIG. 3 is a schematic view illustrating the sleeve section in a first state, forming a first speed stage.

According to an exemplary embodiment of the present invention, referring to FIG. 1, FIG. 2, and FIG. 3, an automotive transmission includes: a first planetary gear set PG1 having first to third rotation elements; an input shaft IN engaged with the first rotation element of the first planetary gear set PG1; an output shaft OUT engaged with the second rotation element of the first planetary gear set PG1 to which the first rotation element of the first planetary gear set PG1 is engaged; and a sleeve section SB sliding linearly along an axial direction of the first planetary gear set PG1 to selectively switch to a first state in which the third rotation element engaged with the second rotation element is secured to a transmission housing CS, a second state in which the third rotation element is engaged with a further rotary element, or a neutral state in which the third rotation element is not secured to or engaged with the transmission housing CS or the further rotary element.

Furthermore, a brake device B1 is provided between the transmission housing CS and the sleeve section SB to restrict rotation of the sleeve section SB with friction force.

That is, the transmission is operated to receive power from a motor at the first rotation element of the first planetary gear set PG1, to output the power to the second rotation element, and to properly control the operation of the third rotation element using the sleeve section SB and the brake device B1, changing gear speed from the power.

The sleeve section SB is operated to sequentially switch to the first state, the neutral state, and the second state while it is sliding linearly.

The first state is a state of forming a first speed stage, and the second state is a state of forming a second speed stage.

As illustrated in FIG. 2, FIG. 3, FIG. 4, FIG. 5, FIG. 6, FIG. 7, and FIG. 8, the sleeve section SB may be operated to switch sequentially between the first state, the neutral state, the second state, and an third state during the linear sliding thereof. The brake device B1 is engaged with the sleeve section SB only in the first state, the neutral state, and the second state, and is disengaged from the sleeve section SB in the third state.

The third state is a state in which although it is similar to the second state in that it forms the second speed stage, it reduces unnecessary drag through disengagement from the bake device B1 to resultantly render power transmission efficiency to be greater. The third state will be referred to hereinafter as a '2D speed stage'.

In an exemplary embodiment of the present invention, in the planetary gear set PG1, the first rotation element is a first sun gear 51, the second rotation element is a first planet carrier C1, and the third rotation element is a first ring gear R1.

In the second state of the sleeve section SB, the first planet carrier C1 of the second rotation element is engaged with the first ring gear R1 of the third rotation element.

The sleeve section SB is respectively provided, on internal and external circumferential surfaces, with internal and external splines IP and OP to be engaged with both the transmission housing CS and the first planet carrier C1, and both the brake device B1 and the first ring gear R1.

Furthermore, a shift fork SF is mounted on the sleeve section SB to externally apply an axial manipulating force.

Subsequently, the operation of the automotive transmission will be described.

FIG. 3 is a schematic view illustrating the sleeve section SB in a first state, forming a first speed stage, wherein the sleeve section SB shifts to the left side from the neutral state of FIG. 2, forming the first speed stage.

In the instant state, the left side of the internal spline IP of the sleeve section SB is engaged with the transmission housing CS, and the external spline OP is engaged with the first ring gear R1 of the first planetary gear set PG1, so that the first ring gear R1 is secured to the transmission housing CS.

Figure 4:
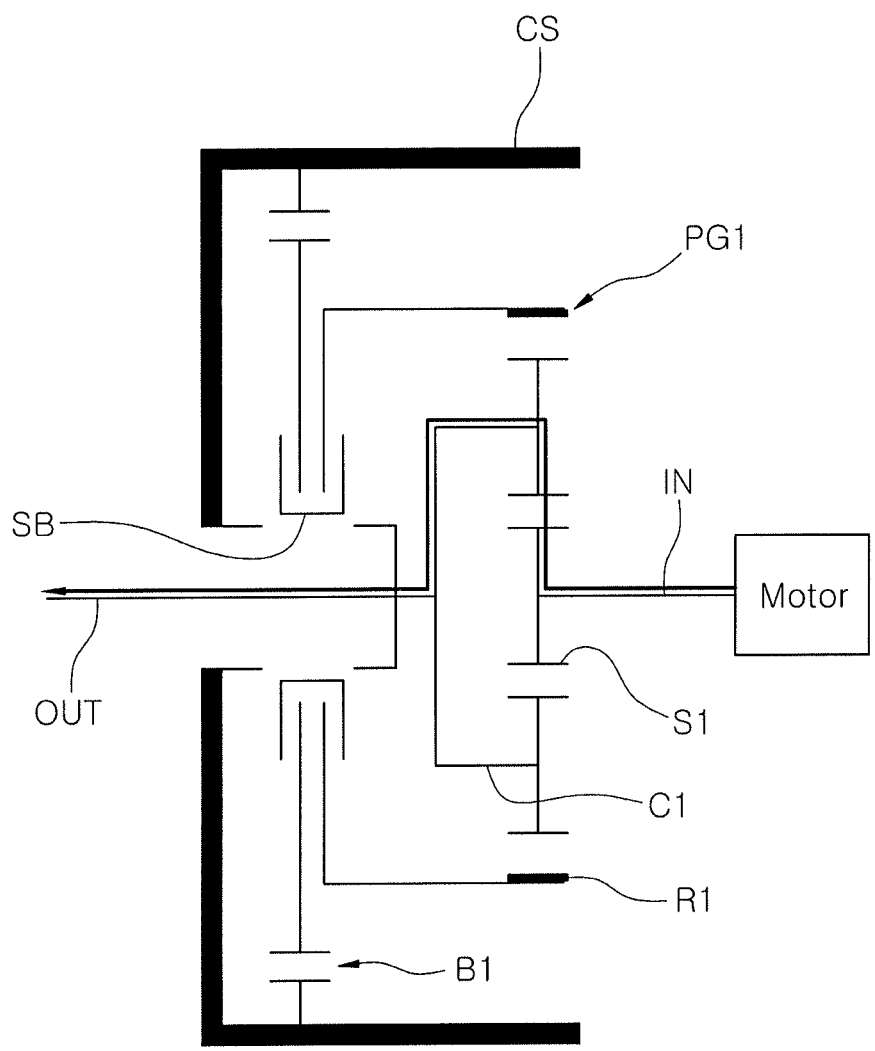
FIG. 4 is a schematic view illustrating a flow of power in the first speed stage shown in FIG. 3.

Thus, as illustrated in FIG. 4, the power output to the first ring gear R1 from the motor is transmitted to the output shaft OUT in a decelerated state through the first planet carrier C1, forming the first speed stage.

Figure 5:
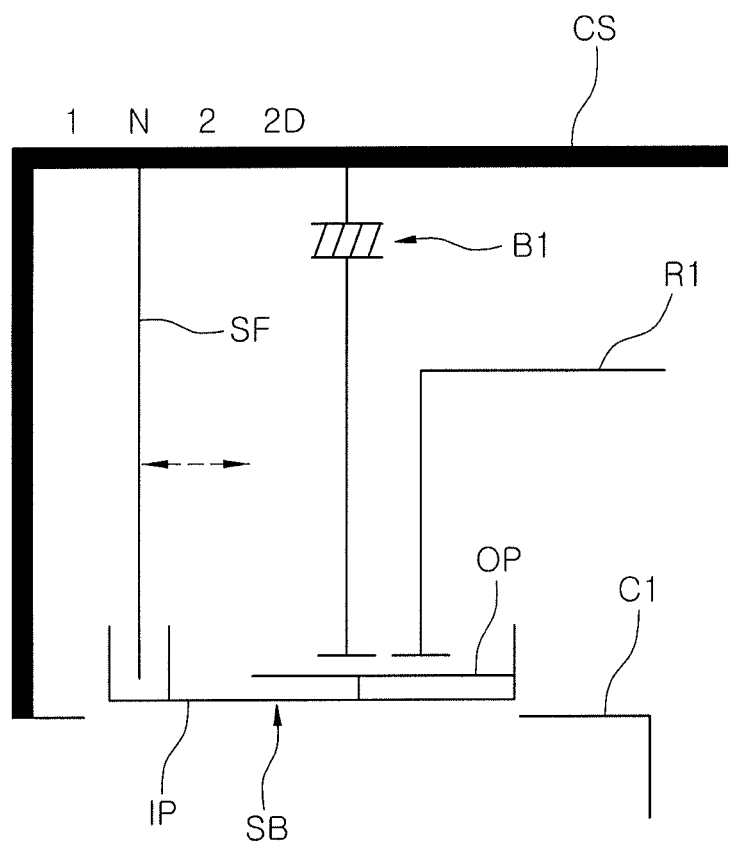
FIG. 5 is a schematic view illustrating the sleeve section switched to the neutral state before changing to a second speed stage from the first speed stage shown in FIG. 3.

To change speed from the first speed stage of FIG. 3 to the second speed stage, the brake device B1 is first engaged to restrict the rotation of the sleeve section SB, and then the sleeve section SB is operated to shift to the neutral state shown in FIG. 5. In the instant state, even when the sleeve section SB is disengaged from the transmission housing CS, the brake device B1 maintains the state of restricting the rotation of the first ring gear R1.

Figure 6:
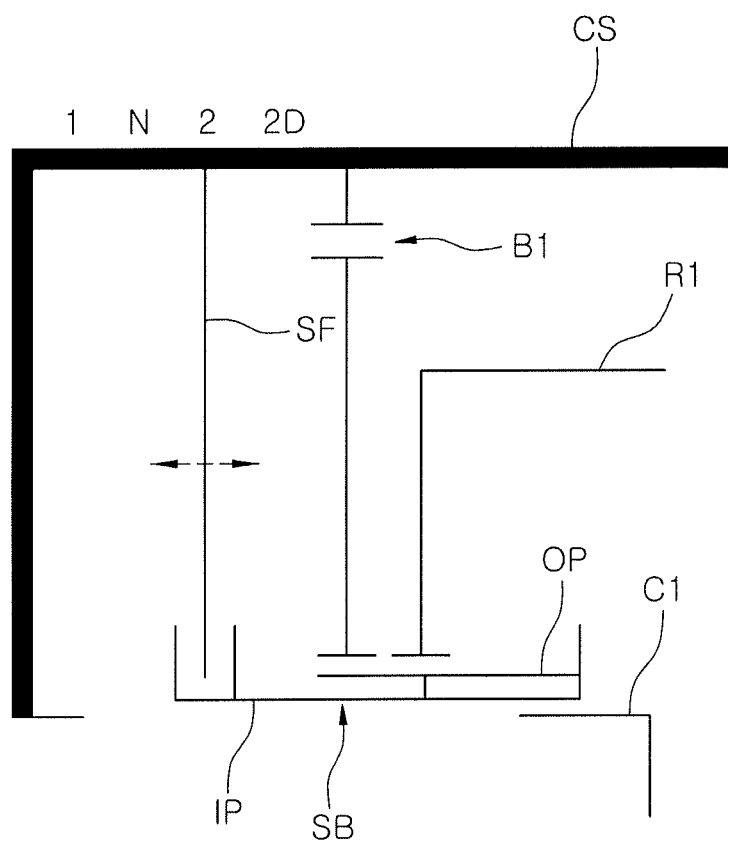
FIG. 6 is a schematic view illustrating the sleeve section in a second state, forming a second speed stage.

As such, when the brake device B1 slips to increase rotation speed of the first ring gear R1, and the driving speed of the motor is decreased in synchronization with the second speed stage, the first ring gear G1 and the first planet carrier C1 are synchronized in speed. Here, as illustrated in FIG. 6, the sleeve section SB is shifted to the second state so that the first ring gear R1 and the first planet carrier C1 are mechanically integrated with each other by the sleeve section SB, and the brake device B1 is completely disengaged.

Figure 7:
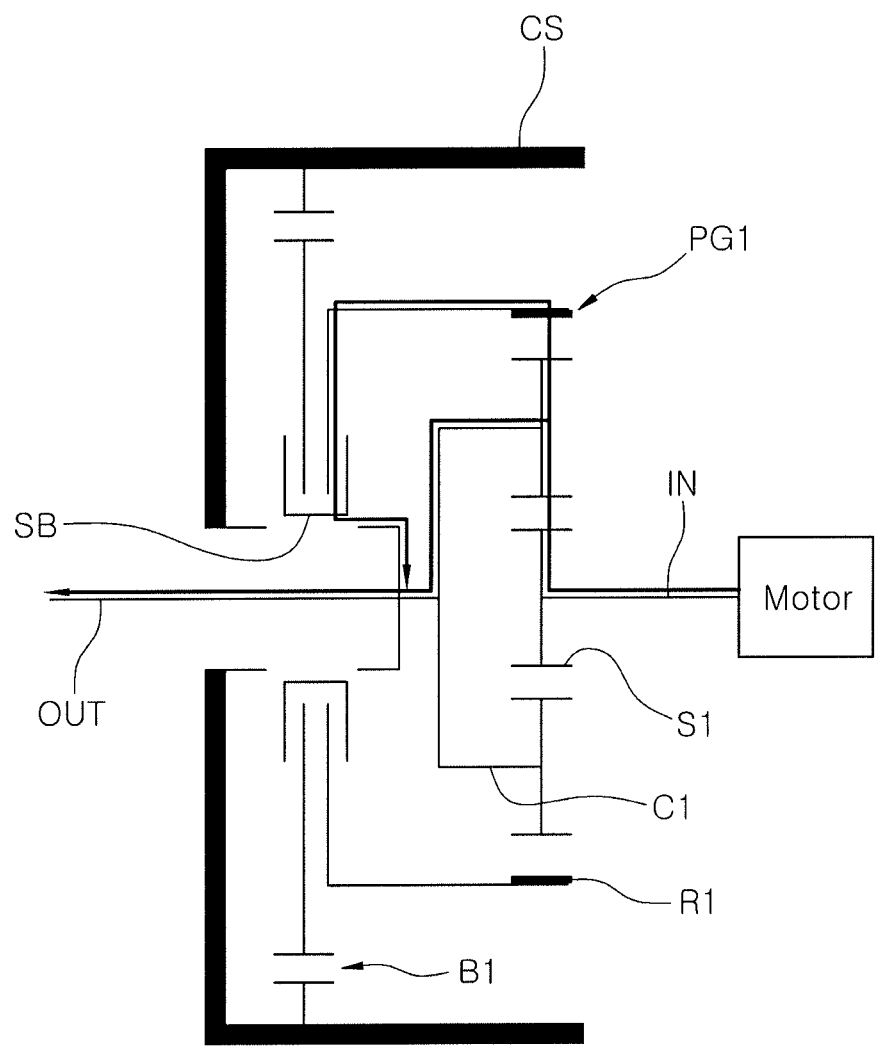
FIG. 7 is a schematic view illustrating a flow of power in the second speed stage shown in FIG. 6.

Thus, all of the rotation elements in the planetary gear set PG1 rotate together, and the power from the motor is output through the output shaft OUT as illustrated in FIG. 7, forming the second speed stage.

Figure 8:
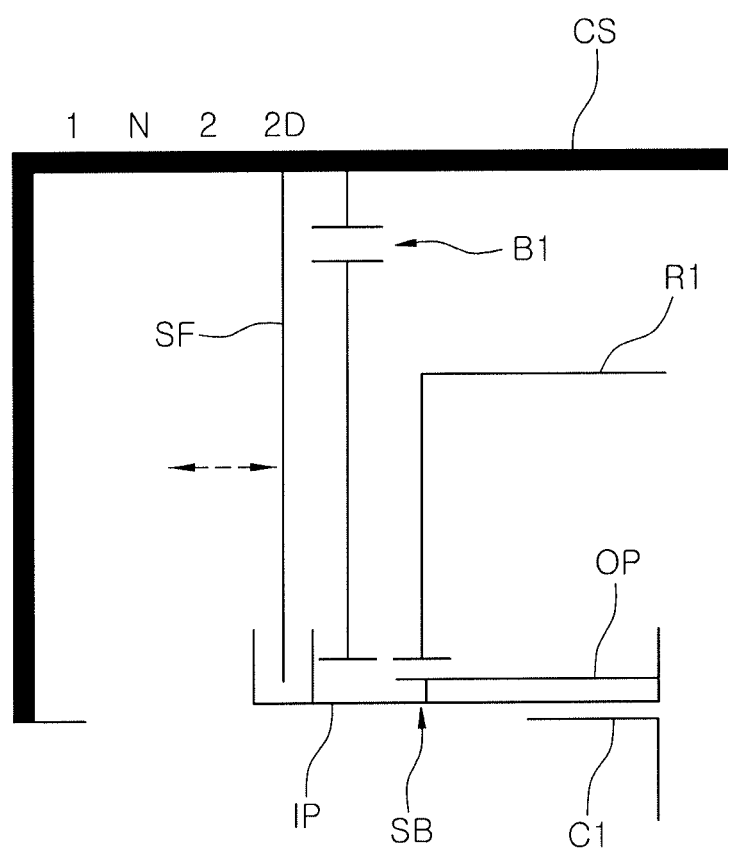
FIG. 8 is a schematic view illustrating the sleeve section in a third state, forming a 2D speed stage.

Although the state of FIG. 7 itself can stably maintain the second speed stage continuously, when the sleeve section SB is shifted to the third state as illustrated in FIG. 8, the brake device B1 is disengaged from the sleeve section SB while the sleeve section SB is being engaged with the first ring gear R1 and the first planet carrier C1. This prevents consumption of a portion of the power, which is caused due to the drag action from the brake device B1, while maintaining the second speed stage, resultantly increasing the power transmission efficiency furthermore.

Figure 9:
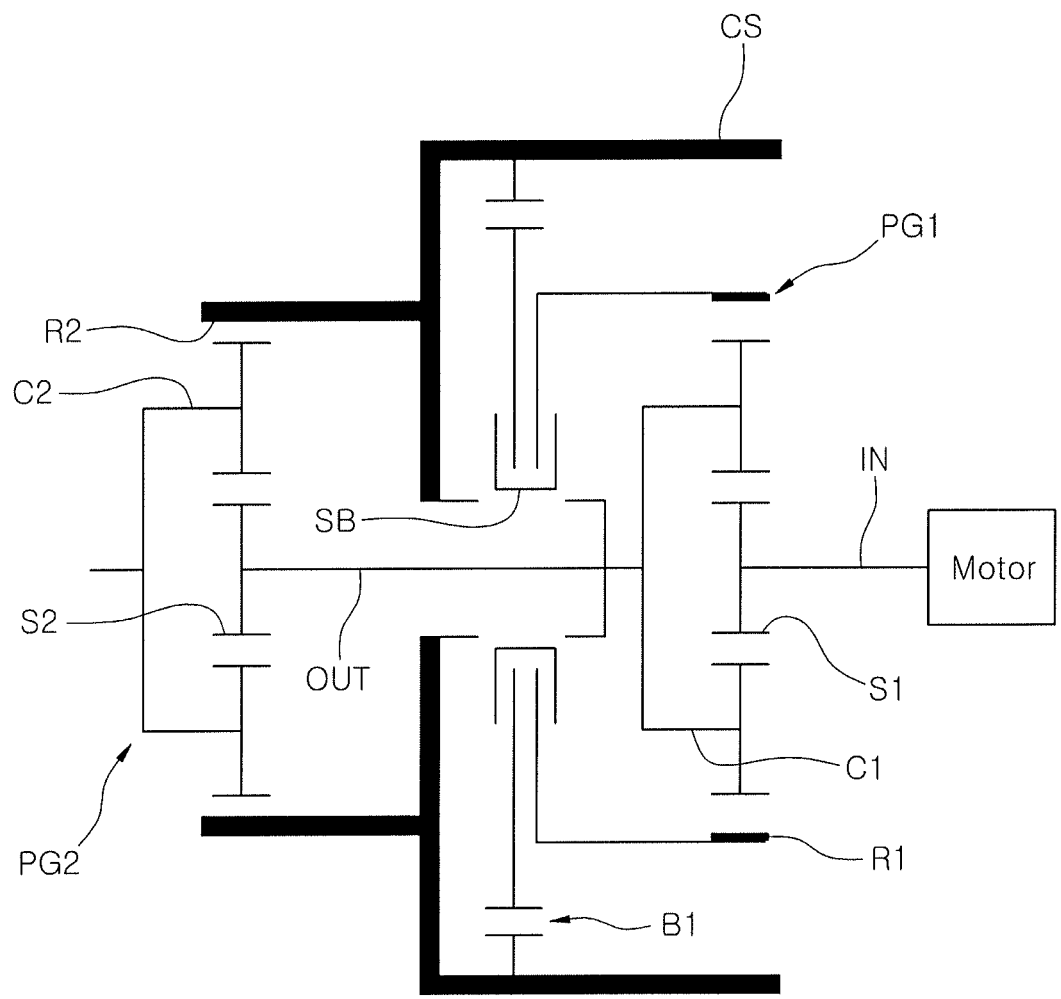
FIG. 9 is a schematic view illustrating the configuration of an automotive transmission according to various exemplary embodiments of the present invention.

FIG. 9 is a schematic view illustrating the configuration of an automotive transmission according to various exemplary embodiments of the present invention. The basic configuration of the present exemplary embodiment of the present invention is the same as or substantially the same as that of FIG. 1, except that a second planetary gear set PG2 is additionally engaged with the first planet carrier C1 of the second rotation element of the first planetary gear set PG1 to additionally decelerate the speed of driving power.

In the exemplary embodiment of the present invention, in the second planetary gear set PG2, a second sun gear S2 is engaged with the first planet carrier C1 of the first planetary gear set PG1, a second ring gear R2 is secured to or integrally formed with the transmission housing CS, and the output shaft OUT is formed on a second planet carrier C2 engaged to the second ring gear R2 and the second sun gear S2, rendering the power input to the second sun gear S2 to be additionally decelerated, and outputting the decelerated power via the second planet carrier C2.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive transmission apparatus comprising:
   a first planetary gear set having a first rotation element, a second rotation element and a third rotation element;
   an input shaft connected to the first rotation element of the first planetary gear set;
   an output shaft fixed to the second rotation element of the first planetary gear set, wherein the first rotation element of the first planetary gear set is engaged with the second rotation element of the first planetary gear set; and
   a sleeve section slidably mounted at the first planetary gear set to selectively switch the automotive transmission apparatus to a first state in which the third rotation element of the first planetary gear set is secured to a transmission housing via a brake device, a second state in which the third rotation element of the first planetary gear set is directly engaged with one rotation element among the first and second rotation elements of the first planetary gear set via the sleeve section, or a neutral state in which the third rotation element is not secured to or engaged with the transmission housing or the one rotation element among the first and second rotation elements via the sleeve section.

2. The automotive transmission apparatus of claim 1, wherein the brake device is mounted between the transmission housing and the sleeve section to selectively restrict a rotation of the sleeve section with friction force by selectively connecting the sleeve section to the transmission housing.

3. The automotive transmission apparatus of claim 2, wherein the sleeve section is operated to switch the automotive transmission apparatus sequentially to one of the first state, the neutral state, and the second state during sliding of the sleeve section.

4. The automotive transmission apparatus of claim 3,
   wherein the sleeve section is operated to switch the automotive transmission apparatus sequentially between the first state, the neutral state, the second state, and a third state during the sliding of the sleeve section, and
   wherein the brake device is engaged with the sleeve section in the first state, the neutral state, and the second state, and is disengaged from the sleeve section in the third state.

5. The automotive transmission apparatus of claim 4, wherein the first rotation element is a first sun gear, the second rotation element is a first planet carrier, and the third rotation element is a first ring gear.

6. The automotive transmission apparatus of claim 1, wherein the one rotation element among the first and second rotation elements is a first planet carrier.

7. The automotive transmission apparatus of claim 6, wherein, in the second state of the sleeve section, the first planet carrier is engaged with the first ring gear.

8. The automotive transmission apparatus of claim 4, wherein the sleeve section is provided, on internal and external circumferential surfaces of the sleeve section, with internal and external splines, respectively, to be engaged with the transmission housing and the first planet carrier, and the brake device and the first ring gear.

9. The automotive transmission apparatus of claim 1, wherein a second planetary gear set is engaged with the second rotation element of the first planetary gear set to decelerate a speed of driving power of the automotive transmission apparatus.

10. The automotive transmission apparatus of claim 9,
    wherein the second planetary gear set includes a fourth rotation element, a fifth rotation element and a sixth rotation element, and
    wherein the fourth rotation element of the second planetary gear set is connected to the second rotation element of the first planetary gear set.

11. The automotive transmission apparatus of claim 10,
    Wherein the fifth rotation element of the second planetary gear set is engaged with the fourth rotation element of the second planetary gear set, and
    wherein the sixth rotation element of the second planetary gear set is fixed to the transmission housing and engaged with the fourth rotation element of the second planetary gear set.

12. The automotive transmission apparatus of claim 11, wherein the fourth rotation element is a second sun gear, the fifth rotation element is a second planet carrier, and the sixth rotation element is a second ring gear.

13. The automotive transmission apparatus of claim 1, wherein the input shaft is fixed to a motor.

* * * * *